Feb. 28, 1967    L. J. KELLER    3,306,501
FEEDER APPARATUS

Filed Oct. 21, 1965    3 Sheets-Sheet 1

INVENTOR
LEONARD J. KELLER
BY
ATTORNEY

Feb. 28, 1967  L. J. KELLER  3,306,501
FEEDER APPARATUS

Filed Oct. 21, 1965  3 Sheets-Sheet 2

INVENTOR
LEONARD J. KELLER
BY
*Richard D. Childress*

ATTORNEY

Feb. 28, 1967   L. J. KELLER   3,306,501
FEEDER APPARATUS

Filed Oct. 21, 1965   3 Sheets-Sheet 3

INVENTOR
LEONARD J. KELLER
BY Richard H. Childress

ATTORNEY

United States Patent Office 3,306,501
Patented Feb. 28, 1967

3,306,501
FEEDER APPARATUS
Leonard J. Keller Columbia, Tenn., assignor to Monsanto Company, St. Louis, Mo., a corporation of Delaware
Filed Oct. 21, 1965, Ser. No. 499,956
16 Claims. (Cl. 222—328)

The present invention relates to, in general, a feeder apparatus for facilitating the handling of pulverulent material and, more particularly, relates to a table feeder apparatus for feeding a stream of pulverulent material to a conveyor, receptacle or the like.

In general, table feeders are used to facilitate the handling of pulverulent material by regulating the feed rate thereof in connection with operations, such as ore handling, kiln feeding, sintering or other material supplying operations, which require a supply of such material at desired rates. Such a feeder apparatus should, among other things, preferably be able to deliver a relatively uniform rate of feed at a selected table speed, to handle various sizes of material with steady throughput and without excessive size segregation or hang-up in the feeder, to respond to changes in table speed thereby accurately controlling and/or regulating the rate of feed from the feeder, and to operate effectively utilizing minimum power requirements as well as to exhibit simplicity of operation for ease of cleaning and maintenance.

It is, therefore, an object of this invention to provide an improved feeder apparatus for pulverulent material.

It is another object of this invention to provide a table feeder apparatus which exhibits accurate feed rates of pulverulent material therefrom at selected table speeds.

It is a further object of this invention to provide a table feder apparatus which can be easily and selectively controlled thus enabling the regulating and/or controlling of feed rates of pulverulent material therefrom.

It is a further object of this invention to provide a table feeder apparatus which can effectively operate on relatively small power requirements.

It is a still further object of this invention to provide a table feeding apparatus which permits the handling of various sized pulverulent material without any appreciable segregation, hang-up, or channeling of such material in the apparatus.

The above objects as well as other objects and advantages of the present invention will become apparent from a reading of the following detailed description.

This invention, in general, pertains to an apparatus useful for feeding a stream of material including a horizontal plate, rotatable about a vertical axis of rotation, for carrying material disposed thereon, a spiral element positioned above the horizontal plate for containing the material disposed on the plate, the spiral element being provided with a passage through which material contained within the element exits in a stream as the plate rotates, a baffle element positioned above the horizontal plate cooperating with the spiral element for directing the stream of material exiting therefrom to a collecting means and means for rotating the horizontal plate, all of which will be more fully discussed hereinafter.

In general, the pulverulent material for use in the apparatus of the present invention may be either in the powdered, granular or particulate solid state or in the liquid-solid (slurry) state.

In order to facilitate the description and understanding of this invention reference is made to the appended drawings in which.

Figure 1:
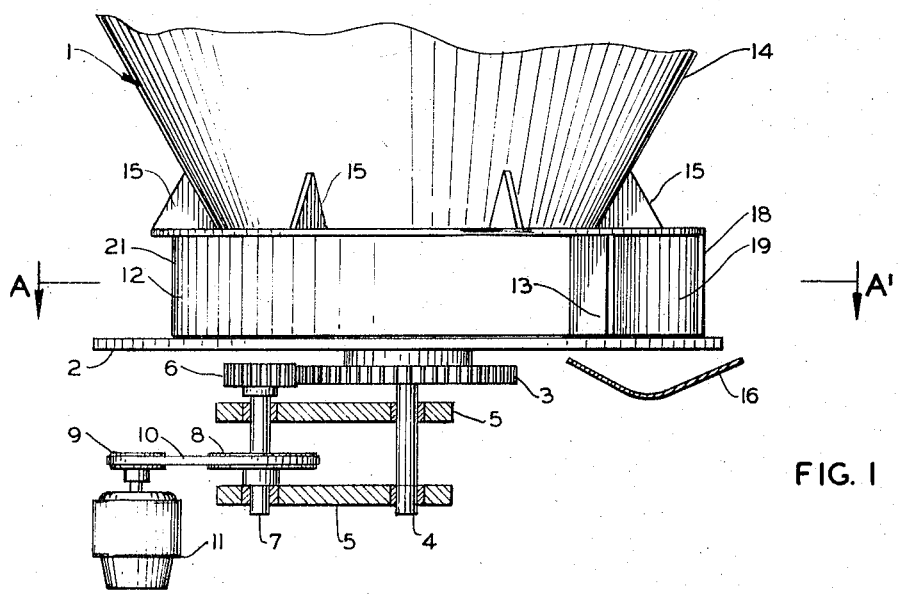
FIGURE 1 is a sectional elevation view of an apparatus embodying the concepts of this invention.

Referring now to FIGURE 1, a feeder apparatus 1 embodying the concepts of this invention is shown. The apparatus includes a horizontal plate 2, preferably substantially flat and circular, mounted on a pinion or gear 3, carried by a shaft 4, rotatably mounted in a bearing support 5. The pinion or gear 3, is in operative engagement with a second gear 6, which is driven by a suitable means, such as an electric motor 11 through shaft 7, also rotatably mounted in bearing support 5, and a suitable pulley, 8 and 9, and belt 10 arrangement. This, therefore, permits the motor 11 to rotate the horizontal plate 2 about a vertical axis of rotation by the hereinbefore described linkage. Positioned co-axially above the horizontal plate 2 and in close proximity thereto is a stationary spiral element 12. The periphery of the horizontal plate 2 extends at least as far as the periphery of the spiral element 12, positioned thereabove. The spiral element 12, which includes a substantially vertical band 21 having the cross-sectional shape of a spiral and a passage 19, is perpendicularly positioned with respect to the horizontal plate 2. Preferably the spiral element 12 is positioned such that there is little spacing between the horizontal plate 2 and the element 12 in order to contain as much material as possible within the spiral element yet permitting the plate to rotate. This spacing can vary depending upon the type and size of the material which the apparatus is handling, but is usually less than about 2 inches. Disposed above the horizontal plate 2 and affixed to the spiral element 12 is baffle element 13, a substantially flat stationary plate, which is perpendicularly positioned with respect to the horizontal plate 2. If desired, however, the baffle element 13 need not be affixed to the spiral element 12 but can be independently positioned above the horizontal plate 2 by means of a suitable framework. A supply means 14, such as a bin or hopper, provided with a discharge throat 20, which may be suspended in a suitable framework, not shown, is disposed such that the throat 20, preferably circular, is co-axially positioned above the spiral element 12. As shown, the spiral element 12 is affixed to the hopper 14 by web sections 15 interconnecting the hopper 14 and the spiral element 12 thus resulting in the spiral element 12 being suspended from the hopper 14. However, the spiral element 12 can be independently positioned above the horizontal plate 2 and thus not affixed to the hopper 14, if such is desired, by means of a suitable framework. A suitable collecting arrangement 16 which can take the form of bins, pans, chutes, conveyors and the like is positioned below or alongside the horizontal plate 2 and in a position to receive material directed by the baffle element 13 off of the horizontal plate 2.

Figure 2:
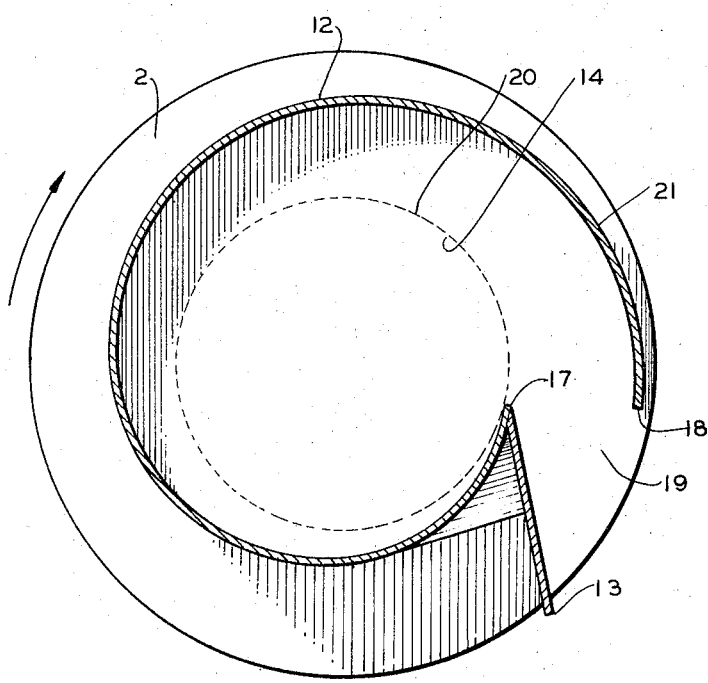
FIGURE 2 is a sectional plan view of the apparatus viewed through the plane containing line A—A′ of FIGURE 1.

With particular reference to FIGURE 2 of the drawings, the spiral element 12, positioned above the horizontal plate 2, is illustrated. The band 21 of the spiral element 12 spirally curves outwardly from a leading edge 17 to a terminal edge 18. The leading edge 17 of the band 21 is disposed in spaced relation to the axis of rotation of the horizontal plate while the terminal edge 18 of the band is disposed within the periphery of the horizontal plate 2 and preferably in close proximity thereto. The band 21 can encompass substantially one complete revolution, as shown, or in some cases may encompass more than one revolution but usually less than two revolutions or may, in other cases, be less than one complete revolution but usually should be greater than about one-third of one revolution in order to perform its intended function. The distance which the leading edge 17 of the band 21 is positioned in relation to the axis of rotation of the horizontal plate 2 can vary depending upon the nature or degree of the spiral but such should be at least the same distance from the axis of rotation of the horizontal plate 2 disposed therebeneath as the radius of the discharge throat 20 of the hopper 14 which is usually substantially less than the radius of the horizontal plate 2. Thus, the band 21 spirally curves outwardly from the discharge throat 20 of the hopper 14 and terminates in a terminal edge 18 in close proximity to the periphery of the horizontal plate 2. The baffle element 13, preferably stationary, is operatively positioned with respect to the leading edge 17 of the band 21 and extends from this edge to at least the periphery of the horizontal plate 2. If desired, the baffle element 13 may extend past the periphery of the horizontal plate 2. The baffle element 13 thus cooperates with the terminal edge 18 to provide a passage 19. The baffle element 13 may extend from the leading edge 17 of the band 21 at any angle between such and a vertical plane passing through the leading edge 17 and terminal edge 18 of the band 21 although such should not make an angle which would appreciably impede or prevent exiting of the material from the passage 19. Usually, this angle should be at least about 30 degrees and preferably about 90 degrees or substantially perpendicular to the above mentioned plane.

Figure 3:
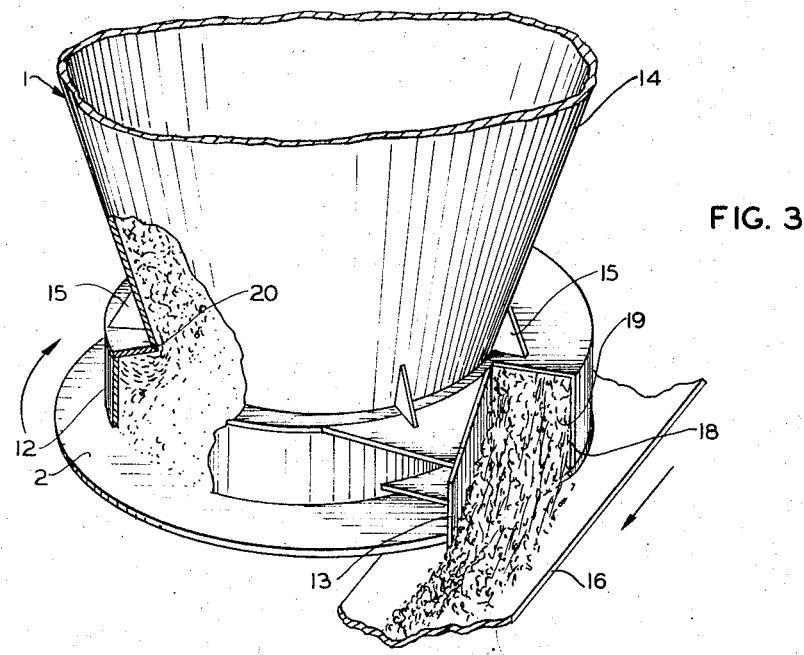
FIGURE 3 is a fragmentary perspective view of an apparatus embodying the concepts of this invention.

Referring now to FIGURE 3, the path which the material takes through the apparatus 1 when in operation is illustrated. The material is placed in hopper 14 by conventional means of loading such as crane buckets, conveyor belts, manual loading and the like, such that there is usually present a substantial amount of the material within the hopper 14. This material passes in vertical gravity flow through the discharge throat 20 of the hopper 14 and into spiral element 12 and a portion thereof is disposed on the horizontal plate 2. As the plate 2 is rotated about a vertical axis of rotation in the direction as shown the material disposed on the plate 2 and contained within the spiral element 12 is carried around by the plate 2 and is exited from the spiral element 12 through passage 19 in a stream which is directed by the baffle element 13 off of the horizontal rotating plate 2 and onto a collecting means 16, as shown a conveyor belt, moving in the direction as indicated. As the material disposed on the plate 2 and contained within the spiral element 12 is carried by the rotating plate 2 a twisting action is imparted to the material which allows the material fed through the discharge throat of the hopper to spirally expand outwardly in the spiral element thus relieving shearing forces within the material and decreasing horizontal material pressures on the apparatus. As a result the material within the hopper 14 appears to feed evenly and downwardly from the hopper 14 into the spiral element 12 and exits therefrom in a stream onto the collecting means 16 via the exiting passage 19 in an improved manner.

The following are set forth as some of the features and advantages to be derived from using the apparatus of the present invention:

(1) The apparatus enables the stream of material to exit therefrom in accurate feed rates at selected horizontal plate speeds.

(2) The apparatus enables an accurate regulation and/or control of exiting material feed rates by varying the speed of the horizontal plate.

(3) The apparatus permits the handling of various type and sized material without any appreciably hang-up or channeling of such material within the hopper or spiral element.

(4) The apparatus enables the horizontal plate to be rotated by substantially reduced power than is usually required for conventional table feeder apparatuses.

Figure 4:
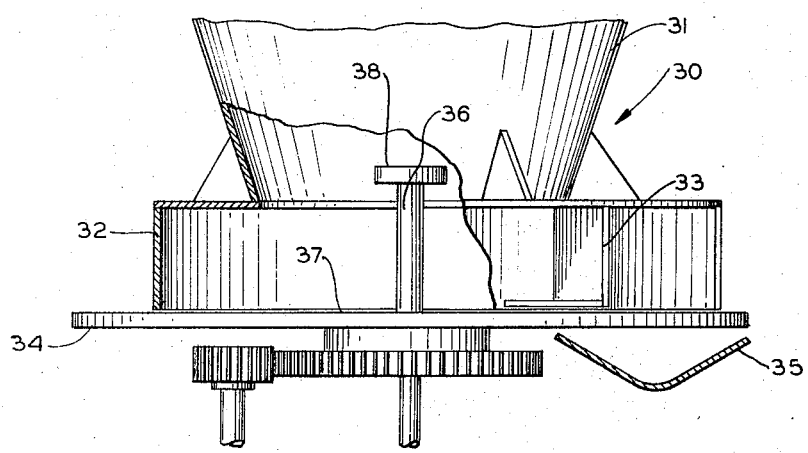
FIGURE 4 is a fragmentary elevation view of another embodiment of the present invention.

In FIGURE 4, a modification of the apparatus of this invention is illustrated. In this figure the apparatus 30 is comprised of a hopper 31, spiral element 32, baffle element 33, as well as a horizontal plate 34 and collecting arrangement 35 disposed beneath the foregoing which generally corresponds to the hopper 14, spiral element 12, baffle element 13, horizontal plate 2 and collecting arrangement 16 of the foregoing described apparatus. In this instance, however, the horizontal plate 34 is provided with an upright member 36 affixed to the plate 2 and extending vertically from the face of the plate 37 into the spiral element 32 and preferably into the hopper 31. The upright member 36, preferably circular with a radius substantially less than the radius of the throat of hopper 31, is positioned with its axis on the axis of rotation of the horizontal plate 34. This member 36 is preferably provided with a top plate 38 which can take various shapes such as being substantially flat (as shown a horizontal circular disc) or can take the shape of an inverted cone. Although the size of the top plate can vary a horizontal circular disc having a radius of about one-third the radius of the discharge throat has been found satisfactory. In operation, this apparatus 30 functions substantially in the same manner as the foregoing described apparatus 1 except that the upright member 36 is rotatable along with the horizontal plate 34 and thus tends to increase the twisting or churning action of the material disposed on the plate 24 and within the spiral element 32 and hopper 31.

Figure 5:
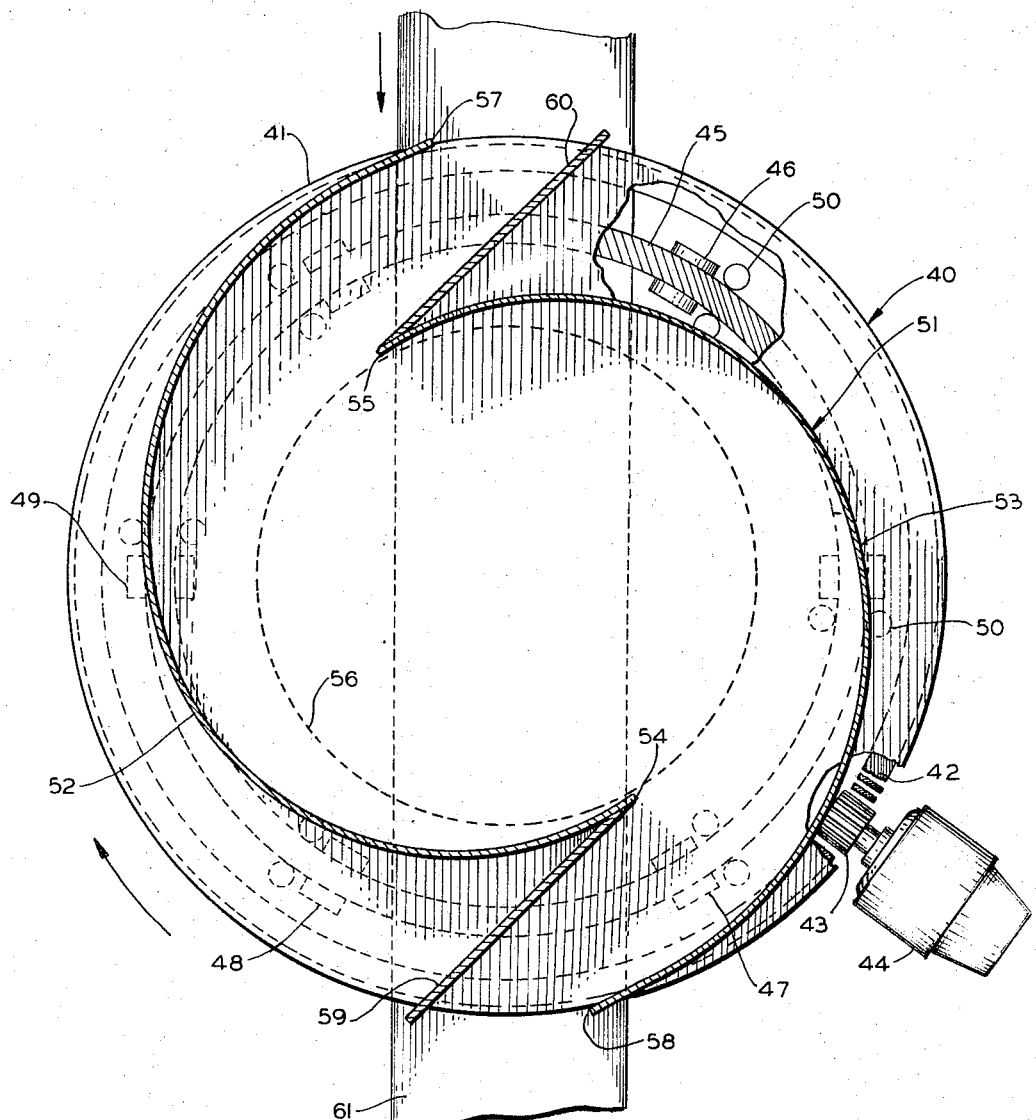
FIGURE 5 is a sectional plan view of another embodiment of the present invention.

In FIGURE 5, another modification of the apparatus of the present invention is illustrated. In this figure, the apparatus 40 is comprised of a hopper, spiral element, baffle element, as well as a horizontal plate and collecting arangement disposed beneath the foregoing which generally corresponds to the hopper 14, spiral element 12, baffle element 13, horizontal plate 2 and collecting arrangement 16 of the foregoing described apparatus. In this instance, however, the horizontal plate 41 is provided with a circular gear 42 on the periphery of the underneath side thereof which is in operative engagement with pinion 43 supported in a bearing by a vertical mount (not shown). Gear 43 is driven through direct linkage by motor 44. Thus, the horizontal plate 41 is rotated about a vertical axis of rotation by direct linkage with motor 44 through gear 43. Additionally, the horizontal plate is supported in a horizontal rotatable position by having provided on the underneath side thereof a raised circular portion 45 supported on horizontal rotating rollers 46, 47, 48 and 49 mounted in vertical mounts (not shown). Vertical guide rollers 50 are provided, being mounted in bearings supported by vertical mounts (not shown), in operative engagement with circular portion 45 in order to minimize lateral displacement of the horizontal plate during rotation. The spiral element 51 includes a pair of oppositely opposed vertical bands, 52 and 53, which spirally curve outwardly from leading edges, 54 and 55, respectively, disposed beneath the hopper discharge throat 56 to terminal edges, 57 and 58, terminating in close proximity to the periphery of the horizontal plate 41. A pair of oppositely opposed baffle elements, 59 and 60, are provided which extend outwardly from leading edges, 54 and 55, respectively, to the periphery of the horizontal plate 41. The collecting arrangement, in this instance a conveyor belt 61, is disposed under the horizontal plate 41 and passes through the center of rotation thereof. In operation, this apparatus 40 functions substantialy in the same manner as the foregoing described apparatus 1 except that material exits the spiral element 51 and thus the rotating (in the direction as shown) horizontal plate 41 in two streams but is collected on a moving conveyor belt 61, moving in the direction as shown, such that only one stream of material is in effect conveyed away from the apparatus 40. This apparatus is especially useful when used with a hopper having a large diameter discharge throat and/or a hopper which is designed for a maximum capacity and throughput with a minimum of height.

It will be understood that various modifications may be made in the embodiments of the apparatus of the present invention which are illustrated herein without departing from the spirit of the invention.

Having thus described my invention and several specific embodiments thereof, what I desire to claim and secure by Letters Patent is:

What is claimed is:

1. A material feeding apparatus comprising, in combination, a horizontal plate, rotatable about a vertical axis of rotation, a spiral element positioned above said plate for confining material disposed on said plate, said spiral element including a band spirally curving outwardly to form a passage through which material confined within said element exists said element in a stream as said plate rotates, a baffle element positioned above said plate cooperating with said spiral element for directing said stream of material exiting therefrom to a collecting means, and means for rotating said plate.

2. A material feeding apparatus comprising, in combination, a horizontal plate, rotatable about a vertical axis of rotation, a hopper positioned above said plate having a discharge throat for supplying material to said plate, a spiral element positioned above said plate and below said hopper for confining material disposed on said plate, said spiral element including a band spirally curving outwardly from said discharge throat of said hopper, a baffle element positioned above said plate cooperating with said band to form a passage through which material confined within said spiral element exits said spiral element in a stream as said plate rotates, said baffle element cooperating with said spiral element for directing said stream of material exiting therefrom to a collecting means, and means for rotating said plate.

3. A material feeding apparatus comprising, in combination, a horizontal flat plate having a circular periphery, rotatable about a vertical axis of rotation, a hopper positioned above said plate, said hopper having a discharge throat within the periphery of said plate for supplying material to said plate, a spiral element positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

4. A material feeding apparatus comprising, in combination, a horizontal flat plate having a circular periphery, rotatable about a vertical axis of rotation, a hopper positioned above said plate, said hopper having a discharge throat within the periphery of said plate for supplying material to said plate, a spiral element co-axially positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

5. A material feeding apparatus comprising, in combination, a horizontal flat plate having a circular periphery, rotatable about a vertical axis of rotation, a hopper positioned above said plate, said hopper having a discharge throat co-axially positioned above said plate and within the periphery thereof for supplying material to said plate, a stationary spiral element co-axially positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a stationary baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

6. A material feeding apparatus comprising, in combination, a horizontal flat plate having a circular periphery, rotatable about a vertical axis of rotation, a hopper positioned above said plate, said hopper having a discharge throat co-axially positioned above said plate and within the periphery thereof for supplying material to said plate, a spiral element suspended below said hopper and positioned above said plate and within the periphery thereof for confining material disposed on said plate, said spiral element including a vertical band spirally curving outwardly from said discharge throat of said hopper and terminating at a terminal edge in close proximity to the periphery of said plate, a stationary baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

7. A material feeding apparatus comprising, in combination, a horizontal plate, rotatable about a vertical axis of rotation, said plate including a co-axially positioned vertical upright member, a spiral element positioned above said plate for confining material disposed on said plate, said spiral element including a band spirally curving outwardly to form a passage through which material confined within said element exits said element in a stream as said plate rotates, a baffle element positioned above said plate cooperating with said spiral element for directing said stream of material exiting therefrom to a collecting means, and means for rotating said plate.

8. A material feeding apparatus comprising, in combination, a horizontal plate, rotatable about a vertical axis of rotation, said plate including a co-axially positioned vertical upright member, a hopper positioned above said plate having a discharge throat for supplying material to said plate, a spiral element positioned above said plate and below said hopper for confining material disposed on said plate, said spiral element including a band spirally curving outwardly from said discharge throat of said hopper, a baffle element positioned above said plate cooperating with said band to form a passage through which material confined within said spiral element exits said spiral element in a stream as said plate rotates, said baffle element cooperating with said spiral element for directing said stream of material exiting therefrom to a collecting means, and means for rotating said plate.

9. A material feeding apparatus comprising, in combination, a horizontal flat plate having a circular periphery, rotatable about a vertical axis of rotation, said plate including a co-axially positioned vertical upright member provided with a horizonal flat circular top plate, a hopper positoned above said plate, said hopper having a discharge throat for supplying material to said plate, a spiral element positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

10. A material feeding apparatus comprising, in combination, a horizontal flat plate having a circular periphery, rotatable about a vertical axis of rotation, said plate including a co-axially positioned vertical upright member provided with a horizontal flat circular top plate, a hopper positioned above said plate, said hopper having a discharge throat for supplying material to said plate, a spiral element co-axially positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

11. A material feeding apparatus comprising, in combination, a horizontal flat plate having a circular periphery, rotatable about a vertical axis of rotation, said plate including a co-axially positioned vertical upright member provided with a horizontal flat circular top plate, a hopper positioned above said plate, said hopper having a discharge throat co-axially positioned above said plate and within the periphery thereof for supplying material to said plate, a stationary spiral element co-axially positioned above said plate and within the periphery thereof and below said hopper for confining material disposed on said plate, said spiral element including a band spirally curving outwardly from said discharge throat of said hopper and terminating at a terminal edge in close proximity to the periphery of said plate, a stationary baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

12. A material feeding apparatus comprising, in combination, a horizontal flat plate having a circular periphery, rotatable about a vertical axis of rotation, said plate including a co-axially positioned vertical upright member provided with a horizontal flat circular top plate, a hopper positioned above said plate, said hopper having a discharge throat co-axially positioned above said plate and within the periphery thereof for supplying material to said plate, a spiral element suspended from said hopper and positioned above said plate and within the periphery thereof for confining material disposed on said plate, said spiral element including a vertical band spirally curving outwardly from said discharge throat of said hopper and terminating at a terminal edge in close proximity to the periphery of said plate, a stationary baffle element positioned above said plate cooperating with said terminal edge to form a passage through which material confined within said spiral element exits said spiral element in a stream as said plate rotates, said baffle element, extending outwardly from said discharge throat of said hopper and terminating in close proximity to the periphery of said plate, cooperating with said spiral element for directing said stream of material exiting therefrom to a collecting means, and means for rotating said plate.

13. A material feeding apparatus comprising, in combination, a horizontal flat plate having a circular periphery rotatable about a vertical axis of rotation, a hopper positioned above said plate, said hopper having a discharge throat within the periphery of said plate for supplying material to said plate, a spiral element positioned above said plate and within the periphery thereof and below said hopper for confining material disposed on said plate, said spiral element including a pair of oppositely opposed bands spirally curving outwardly from said discharge throat of said hopper and terminating at terminal edges in close proximity to the periphery of said plate, a pair of oppositely opposed baffle elements positioned above said plate, each of said baffle elements cooperating with a terminal edge of an adjacently disposed vertical band to form a passage through which material confined within said spiral element exits said spiral element in a stream as said plate rotates, each of said baffle elements, extending outwardly from said discharge throat of said hopper and terminating in close proximity to the periphery of said plate, cooperating with said spiral element for directing said stream of material exiting therefrom to a collecting means, and means for rotating said plate.

14. A material feeding apparatus comprising, in combination, a horizontal flat plate having a circular periphery, rotatable about a vertical axis of rotation, a hopper positioned above said plate, said hopper having a discharge throat co-axially positioned above said plate and within the periphery thereof for supplying material to said plate, a spiral element suspended below said hopper and positioned above said plate and within the periphery thereof for confining material disposed on said plate, said spiral element including a pair of oppositely opposed vertical bands spirally curving outwardly from said discharge throat of said hopper and terminating at the terminal edges in close proximity to the periphery of said plate, a pair of oppositely opposed baffle elements positioned above said plate, each of said baffle elements cooperating with a terminal edge of an adjacently disposed vertical band to form a passage through which material confined within said spiral element exits said spiral element in a stream as said plate rotates, each of said baffle elements, extending outwardly from said discharge throat of said hopper and terminating in close proximity to the periphery of said plate, cooperating with said spiral element for directing said stream of material exiting therefrom to a collecting means, and means for rotating said plate.

15. A material feeding apparatus comprising, in combination, a horizontal flat plate having a circular periphery, rotatable about a vertical axis of rotation, said plate including a co-axially positioned vertical upright member provided with a horizontal flat circular top plate, a hopper positioned above said plate, said hopper having a discharge throat for supplying material to said plate, a spiral element positioned above said plate and within the periphery thereof and below said hopper for confining material disposed on said plate, said spiral element including a pair of oppositely opposed bands spirally curving outwardly from said discharge throat of said hopper and terminating at a terminal edge in close proximity to the periphery of said plate, a pair of oppositely opposed baffle elements positioned above said plate, each of said baffle elements cooperating with a terminal edge of an adjacently disposed vertical band to form a passage through which material confined within said spiral elements exits said spiral element in a stream as said plate rotates, each of said baffle elements, extending outwardly from said discharge throat of said hopper and terminating in close proximity to the periphery of said plate, cooperating with said spiral element for directing said stream of material exiting therefrom to a collecting means, and means for rotating said plate.

16. A material feeding apparatus comprising, in combination, a horizontal flat plate having a circular periphery, rotatable about a vertical axis of rotation, said plate including a co-axially positioned vertical upright member provided with a horizontal flat circular top plate, a hopper positioned above said plate, said hopper having a discharge throat co-axially positioned above said plate and within the periphery thereof for supplying material to said plate, a spiral element suspended from said hopper and positioned above said plate and within the periphery thereof for confining material disposed on said plate, said spiral element including a pair of oppositely opposed vertical bands spirally curving outwardly from said discharge throat of said hopper and terminating at a terminal edge in close proximity to the periphery of said plate, a pair of oppositely opposed baffle elements positioned above said plate, each of said baffle elements cooperating with a terminal edge of an adjacently disposed vertical band to form a passage through which material confined within said spiral elements exits and spiral element in a stream as said plate rotates, each of said baffle elements, extending outwardly from said discharge throat of said hopper and terminating in close proximity to the periphery of said plate, cooperating with said spiral element for directing said stream of material exiting therefrom to a collecting means, and means for rotating said plate.

References Cited by the Examiner

UNITED STATES PATENTS

| | | | |
|---|---|---|---|
| 2,297,383 | 9/1942 | Augustin | 222—410 X |
| 2,941,651 | 6/1960 | Hutter et al. | 198—30 |
| 3,083,471 | 4/1963 | Huntington | 222—410 X |

FOREIGN PATENTS

| | | |
|---|---|---|
| 465,947 | 6/1950 | Canada. |
| 901,605 | 11/1964 | France. |

ROBERT B. REEVES, *Primary Examiner.*

N. L. STACK, *Assistant Examiner.*